(12) United States Patent  (10) Patent No.: US 7,830,898 B2
Foschiano et al.  (45) Date of Patent: Nov. 9, 2010

(54) METHOD AND APPARATUS FOR INTER-LAYER BINDING INSPECTION

(75) Inventors: Marco E. Foschiano, San Jose, CA (US); Justin Qizhong Chen, Palo Alto, CA (US); Ambarish Chintamani Kenghe, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/044,311

(22) Filed: Mar. 7, 2008

(65) Prior Publication Data

US 2008/0151887 A1 Jun. 26, 2008

Related U.S. Application Data

(63) Continuation of application No. 10/210,190, filed on Jul. 31, 2002, now Pat. No. 7,346,057.

(51) Int. Cl.
*H04L 12/56* (2006.01)
*G06F 15/16* (2006.01)

(52) U.S. Cl. .................. 370/401; 709/232; 726/13; 726/26

(58) Field of Classification Search .......... 370/389, 370/392, 400, 401, 464–469, 475, 229–232, 370/252, 253, 412, 413, 415, 417; 709/230–237; 713/151, 161, 168; 726/2, 3, 11, 12, 13, 726/22, 23, 26

See application file for complete search history.

(56) References Cited

U.S. PATENT DOCUMENTS

| 6,108,786 | A | * | 8/2000 | Knowlson | ............... 726/11 |
| 6,151,679 | A | * | 11/2000 | Friedman et al. | ............ 370/392 |
| 6,363,489 | B1 | * | 3/2002 | Comay et al. | ............... 726/22 |
| 6,738,814 | B1 | * | 5/2004 | Cox et al. | ............... 709/225 |
| 6,745,333 | B1 | * | 6/2004 | Thomsen | ............... 726/23 |
| 6,775,657 | B1 | * | 8/2004 | Baker | ............... 706/45 |
| 2003/0110394 | A1 | * | 6/2003 | Sharp et al. | ............... 713/200 |
| 2006/0156404 | A1 | * | 7/2006 | Day | ............... 726/23 |

FOREIGN PATENT DOCUMENTS

| CN | 1357997 | 7/2002 |
| WO | WO 01/06726 | 1/2001 |
| WO | WO 02/21244 | 3/2002 |
| WO | WO 02/35795 | 5/2002 |

\* cited by examiner

*Primary Examiner*—Aung S Moe
*Assistant Examiner*—Kerri M Rose
(74) *Attorney, Agent, or Firm*—Campbell Stephenson LLP

(57) ABSTRACT

A method for inspecting packets is disclosed. The method includes processing a packet by determining if the packet is an inter-layer binding protocol packet and inspecting the packet, if the packet is an inter-layer binding protocol packet. The inter-layer binding protocol packet indicating a binding between a first network layer address and a second network layer address.

14 Claims, 9 Drawing Sheets

METHOD AND APPARATUS FOR INTER-LAYER BINDING INSPECTION

CROSS-REFERENCE TO RELATED APPLICATIONS

This application is a continuation of U.S. patent application Ser. No. 10/210,190, entitled "Method and Apparatus for Inter-Layer Binding Inspection", filed Jul. 31, 2002, now U.S. Pat. No. 7,346,057 and naming Marco E. Foschiano, Justin Qizhong Chen, and Ambarish Chintamani Kenghe as inventors. This application is hereby incorporated by reference, in its entirety and for all purposes.

BACKGROUND OF THE INVENTION

1. Field of the Invention

This invention relates to the field of information networks, and more particularly relates to a method and apparatus for inspecting the bindings created by a packet of an inter-layer binding protocol.

2. Description of the Related Art

The arsenal of tools available for both protecting and penetrating networking environments is impressive in both quantity and ability. Some of these tools are highly specialized, while other are multipurpose and serve as building blocks for larger toolkits. One such tool is the network "sniffer." Network "sniffing," in its most generic form, consists of intercepting communications (e.g., frames or packets) from the network and viewing their contents. The ability to do this has been widespread for some time and has been employed by network administrators (e.g., troubleshooting problems), so-called "crackers" (those intercepting passwords and files) and others. It will be noted that, in relative terms, it is only recently that network sniffing has become possible on a switched network. As might be expected, tools that allow network sniffing on switched networks have now surfaced. A brief explanation of the manner in which non-switched networks operate, as well as how such networks can be sniffed, as well as the manner in which switched networks operate and how these networks can also be sniffed.

FIG. 1A is a block diagram illustrating generally the architecture of a non-switched network environment, depicted in FIG. 1A as a network 100. Included in network 100 are a number of nodes (nodes 102(1)-(N)) that are coupled to a router 104 by a hub 106. Each of nodes 102(1)-(N) is coupled to a respective port of hub 106 (not shown). In the non-switched network environment depicted in FIG. 1A, the concept of a network segment exists. A segment is a network architecture that resides behind a router, bridge, hub or switch, in which every node is directly addressable from every other node. This is also referred to in certain networks as a sub-net. Nodes 102(1)-(N), then, are depicted in FIG. 1A as being in a segment (depicted in FIG. 1A as a sub-net 108).

In a non-switched environment, frames are handled in a broadcast manner. That is, when one node transmits a frame, it is 'seen' by every node on the segment. Each node, in turn, briefly examines the frame to see if the frame is addressed to the given node. If not, the given node discards the frame. However, if the node is the intended recipient, the node accepts the frame for processing. For the purposes of this discussion, node 102(2) is designated as the host that employs a sniffing agent. Nodes 102(1) and 102(3) represent the 'innocents' who are merely trying to communicate with one another.

FIG. 1B is a flow diagram illustrating the flow of traffic in a non-switched network when one or more datastreams in the network are sniffed. In order for a node to be used as a sniffing agent, the node's network interface is set to 'promiscuous' mode. Setting this mode typically requires root or administrator access at the node. After this mode is set, the node's network interface will no longer drop network frames which are addressed to other hosts. Rather, the node's network interface will pass these frames up to the higher network layers with the expectation that some software at a higher layer will process such frames.

The process depicted in FIG. 1B begins with node 102(1) transmitting a frame, and indicating in the frame that the frame is being transmitted to node 102(3) (step 150). Hub 106 then broadcasts the frame to each of its active ports (step 155). Node 102(2) receives the frame and examines the destination address in the frame (steps 160 and 165). Because node 102(2) is set to 'promiscuous' mode (step 170), node 102(2) accepts the frame (although not addressed to node 102(2)) (step 175). As noted, setting the node's network interface to 'promiscuous' mode allows the network interface to accept any frames, regardless of the address (e.g., MAC (Media Access Control) address) in the frame. However, even though the interface will save the frame, some higher level software is typically required to process the data. Next, others of nodes 102(1)-(N) (e.g., other nodes coupled to active ports on hub 106) receive the frame and determine that they are not the intended host (steps 160, 165 and 170), and so discard the frame (step 180). (Of course, were the network interface of node 102(2) not set to 'promiscuous' mode, node 102(2) would ignore the packet, as well.) In the case of the intended destination (node 102(3)), node 102(3) also receives the frame and examines the frame's destination address (steps 160 and 165). After node 102(3) determines that it is the intended host (step 125), node 102(3) processes the frame further (step 185).

For completeness, it should be noted that the actions of steps 160/165/170/180, 160/165/170/175, and 160/165/185, may variously be transposed or occur simultaneously, as the prediction as to which node will receive the frame first is not important for purposes of this discussion. For practical purposes, it can be assumed that these operations occur at the same time, without loss of generality.

From FIGS. 1A and 1B, it can be seen that a non-switched environment is susceptible to sniffing. Such an environment requires little extra effort on the part of the sniffing agent, because the hub broadcasts the frames to all active ports. As alluded to earlier, several such sniffing utilities exist, and are publicly available. Such capabilities allow unscrupulous parties to view information as the information is passed between "innocent" nodes, unnoticed by those nodes or their users, in an arrangement referred to as a "man-in-the-middle" attack. Moreover, once a hacker sniffing the datastream have inserted themselves between the innocent parties, the hacker is at liberty to generate all manner of replies to either side, in a completely transparent manner.

FIG. 2A is a block diagram illustrating generally the architecture of a switched network environment, depicted in FIG. 2A as a network 200. In a switched network environment, the concept of a network segment continues to exist, but such a network segment includes only the switch and the node concerned, and frames are handled in a direct manner. That is, frames from a first node to a second node are only sent across the circuits in the switch that are necessary to complete a connection between the first and second nodes.

Included in network 200 are a number of nodes (nodes 202(1)-(N)) that are coupled to a router 204 by a switch 206. Each of nodes 202(1)-(N) is coupled to a respective port of switch 206 (not shown). In the switched network environment depicted in FIG. 2A, the concept of a network segment exists. A segment is a network architecture that resides behind a router, bridge, switch or switch, in which every node is directly addressable from every other node. This is also referred to in certain networks as a sub-net. Nodes 202(1) and 202(3), then, are depicted in FIG. 2A as being in a segment (depicted in FIG. 2A as a sub-net 208).

FIG. 2B is a flow diagram illustrating the normal flow of traffic in a switched network. First, node 202(1) transmits a frame, and indicates in the frame that the frame is being transmitted to node 202(3) (step 210). Switch 206 then examines the frame and determines to which node (port) a connection should be made (step 220). Once this determination has been made, switch 206 configures a connection between the ports to which nodes 202(1) and 202(3) are coupled, respectively (step 230). Switch 206 then forwards the frame to its intended node, node 202(3) (step 240). Once node 202(3) receives the frame, node 202(3) examines the frame's destination address to determine if node 202(3) is the frame's intended destination (step 250). If this address determination indicates that node 202(3) is not the proper destination, the frame is not processed. Otherwise, node 202(3) performs whatever processing is a matter of course for the frame (step 260).

This mode of operation carries some intrinsic benefits:

1) Lower network traffic because frames are not broadcasted to each node, which translates to a higher bandwidth through a reduction in the collision domain.

2) Lower node processing overhead as a result of each node only having to process frames that are meant for that node.

However, there are some tradeoffs. For example, the switch is burdened with higher overhead processing requirements because the switch must create, on the fly, virtual connections between machines.

As can be seen, a switched network is not as exposed to sniffing as a non-switched network because a non-switched network does not broadcast most frames. However, several methods are available to sniff switched networks. An example of such methods is address resolution protocol (ARP) spoofing, which is briefly discussed below.

One of the basic operations of the internet protocol (IP) revolves around ARP (Address Resolution Protocol) requests and replies. In general, when a first node wants to communicate with a second node on the network, the first node sends an ARP request. The second node will send an ARP reply that includes its MAC address. Even in a switched environment, this initial ARP request is sent in a broadcast manner. It is possible for a third node to craft and send an unsolicited, fake ARP reply to the first node. This fake ARP reply will specify that the third node has the IP address of the second node. The first node then unwittingly sends the traffic to the third node since the third node has represented itself to have the intended IP address. Some available tools are specialized for sending fake ARP replies to classes of machines (e.g., NFS servers, HTTP servers and the like). One such tool is "dsniff" and works well in sniffing for specific types of traffic. Other tools listen for the general ARP request and send the fake ARP reply at that time, and serve well to sniff an entire network. For this type of attack to work, the ability to forward the frames received on to their intended destination. This is most commonly achieved through some type of IP forwarding, either at the kernel or application level.

While there are several methods to protect again such attacks, each is not without its own disadvantages. (It will be noted that some of these methods are applicable to both non-switched and switched network environments.) These solutions include IP filtering, port security, and routing security.

By enabling IP filtering on the switch, a user directly specifies which traffic is allowed to flow to and from each port. While potentially effective, such an approach can be a monumental effort to put in place and manage, especially if the environment is dynamic.

Alternatively, if the hub or switch has the ability to enable port security, such measures can help to protect the network's nodes from both MAC flooding and MAC spoofing attacks. This feature effectively prevents the hub or switch from recognizing more than one MAC address on a physical port. However, this, like many security procedures, restricts the environment and amplifies the need for a management process, as well as an auditing process.

Moreover, pushing security to the network node level is undesirable for a variety of reasons. First, it makes the source of security available to anyone with access to such nodes. Also, it greatly amplifies the task of managing such security measures, because each node must be separately configured to support such security measures. This proves particularly challenging in network environments where nodes' connectivity changes dynamically (e.g., the laptop example).

SUMMARY

In one embodiment, a network device is disclosed. The network device includes a forwarding engine and an inspection engine, coupled to the forwarding engine. The forwarding engine is configured to forward a packet to the inspection engine, if the packet is a inter-layer binding protocol packet. The inspection engine is configured to inspect the inter-layer binding protocol packet.

In one embodiment, a method for inspecting packets is disclosed. The method includes processing a packet by determining if the packet is an inter-layer binding protocol packet and inspecting the packet, if the packet is an inter-layer binding protocol packet. The inter-layer binding protocol packet indicating a binding between a first network layer address and a second network layer address.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

Systems and methods according to embodiments of the present invention provide for the inspection of inter-layer binding protocol (ILBP) packets to prevent erroneous and/or unauthorized bindings from being given effect, and so causing mis-routing of information (e.g., packets) in the affected network. An example of an ILBP is the address resolution protocol (ARP), which binds an internet protocol (IP) address (layer 3) to a media access control (MAC) address (layer 2). Another example of an ILBP is the network discovery protocol (NDP) of IP version 6. Such systems and methods provide such protection by identifying ILBP packets and analyzing only those packets, thus minimizing the method's impact on throughput. If the packets are illegal, either due to malicious or mistaken actions, the illegal packet is dropped. Moreover, rate limiting can be achieved by dropping ILBP packet(s) prior to analysis, by shutting down a port transmitting large volumes of such packets, or other appropriate response. This prevents packet storms, and the overload of the inspection engine analyzing such packets.

Example of Inter-Layer Binding Inspection According to the Present Invention

Figure 1A:
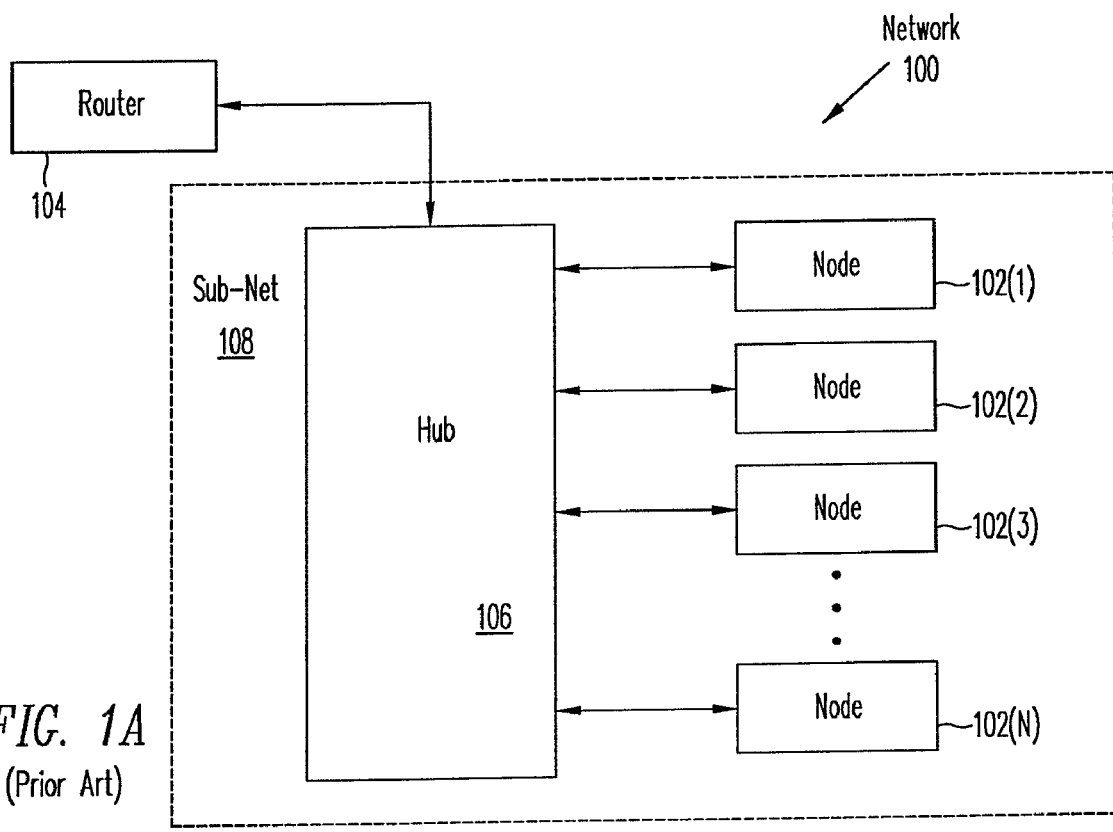
FIG. 1A is a block diagram illustrating a non-switched network of the prior art.
Figure 2A:
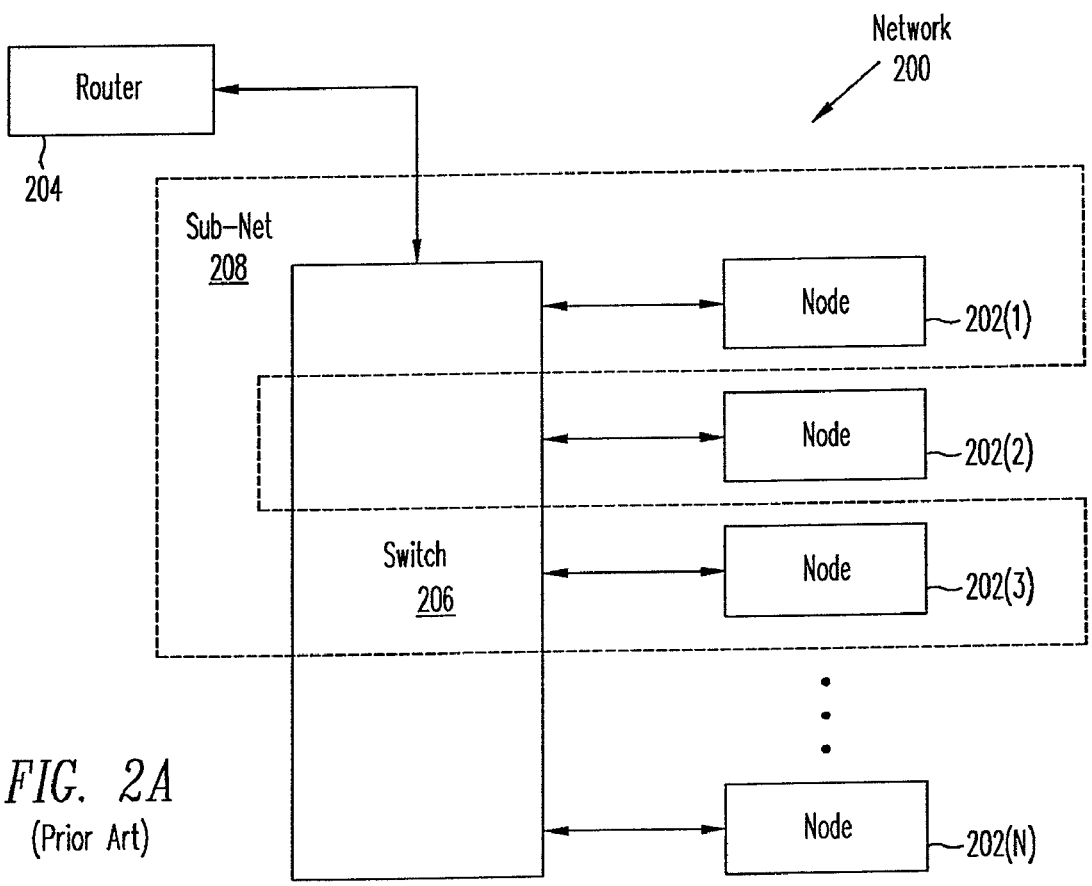
FIG. 2A is a block diagram illustrating a switched network of the prior art.
Figure 1B:
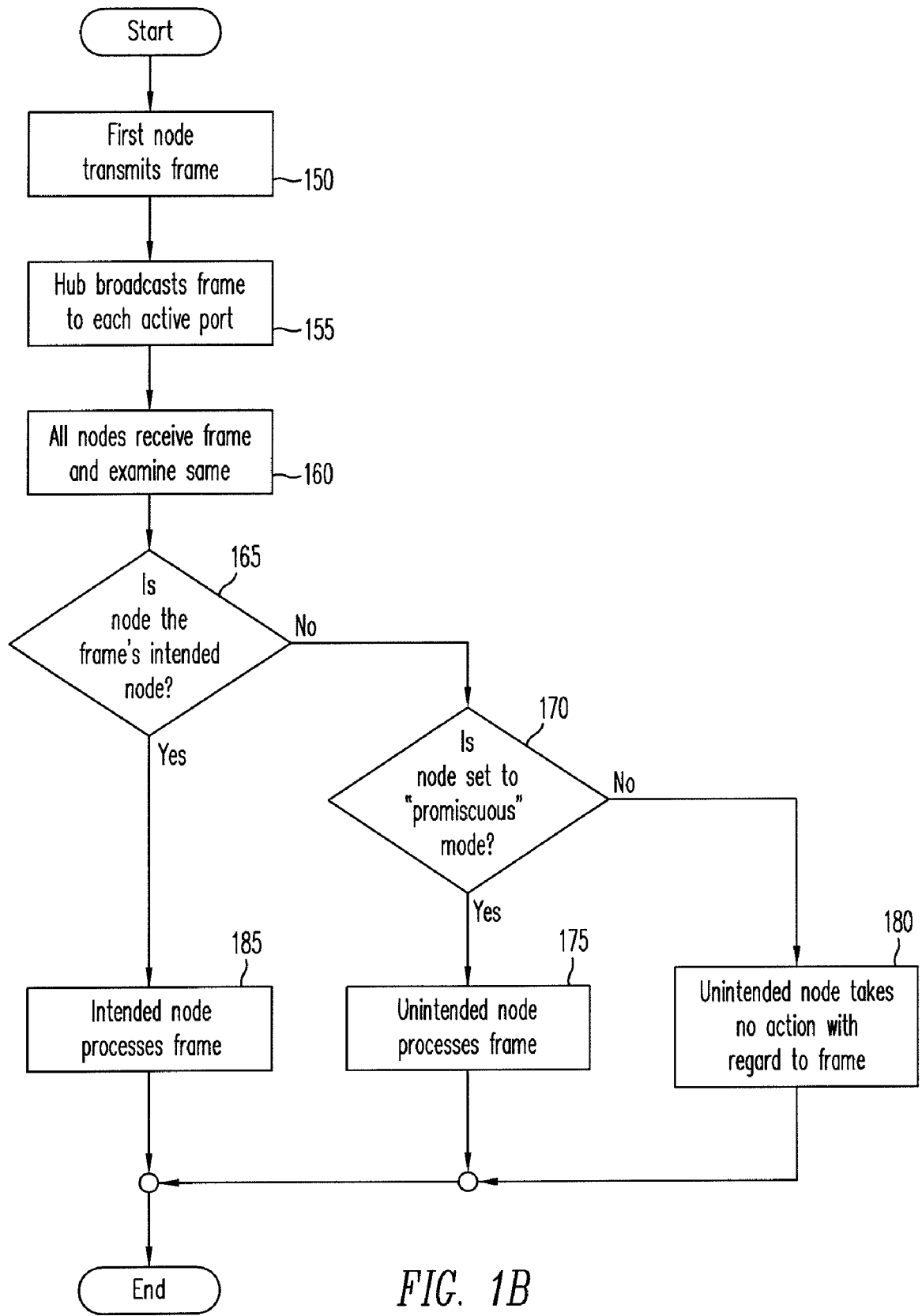
FIG. 1B is a flow diagram illustrating the operation of a non-switched network of the prior art.
Figure 2B:
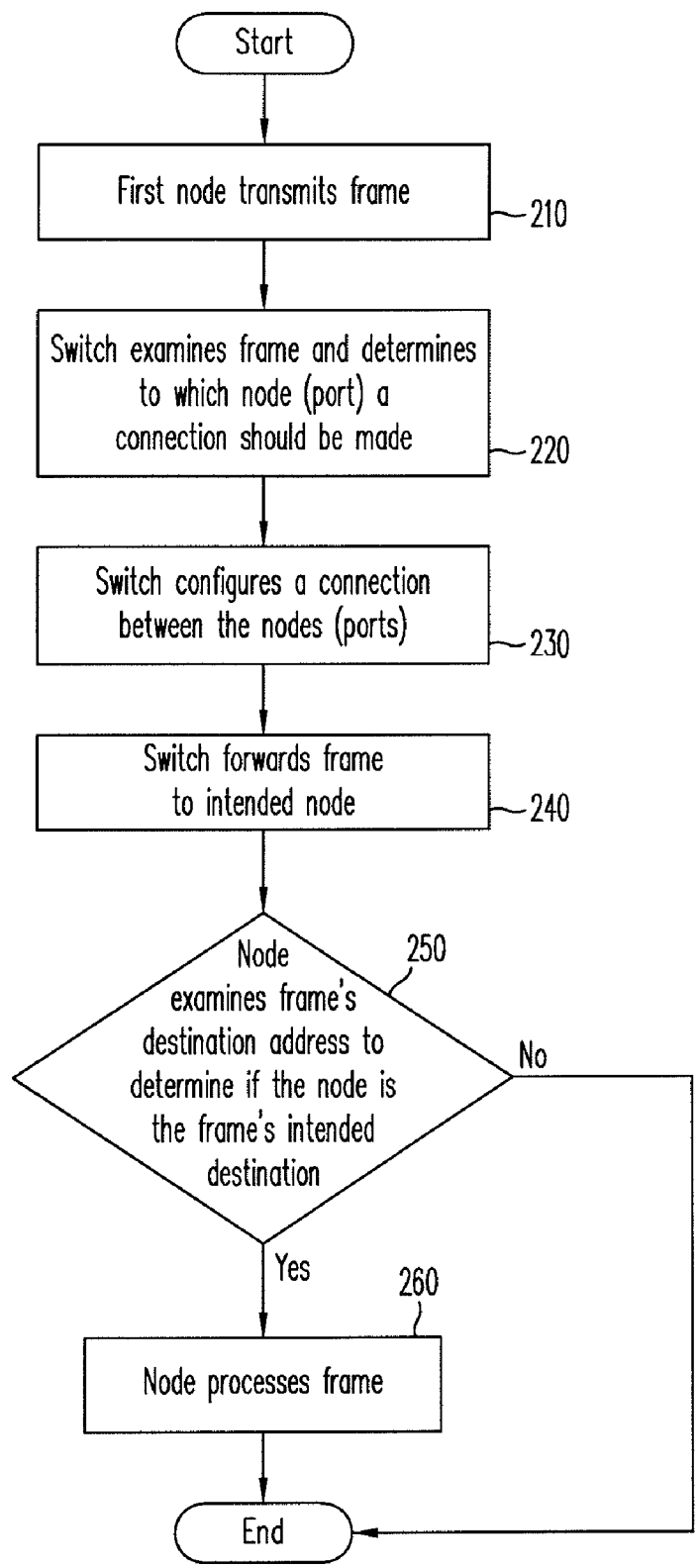
FIG. 2B is a flow diagram illustrating the operation of a switched network of the prior art.
Figure 3:
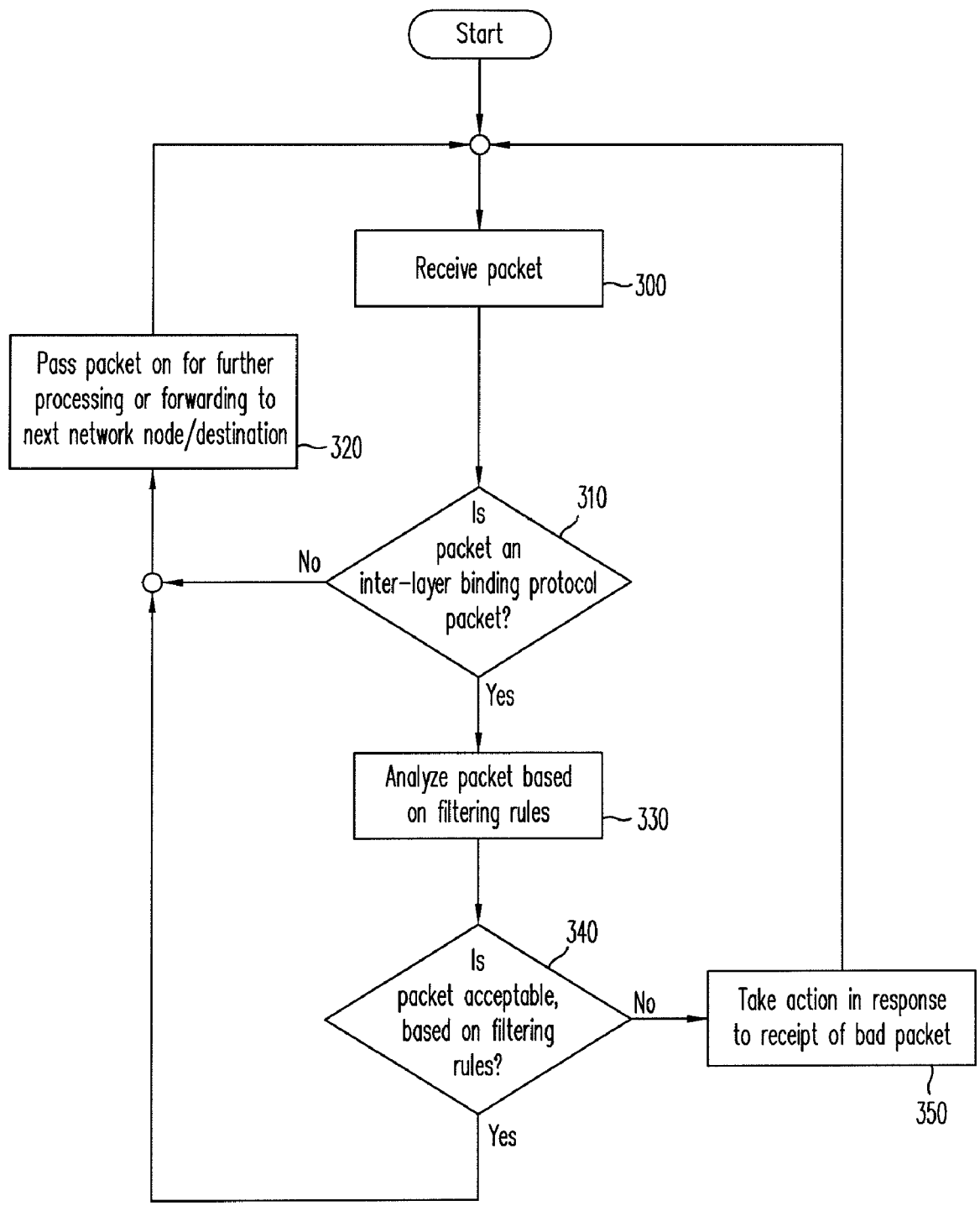
FIG. 3 is a flow diagram illustrating, generally, a process for inter-layer binding inspection according to embodiments of the present invention.

FIG. 3 is a flow diagram illustrating, generally, a process for inter-layer binding inspection according to embodiments of the present invention. The process begins with the receipt of a protocol packet (or frame or other unit of communication) (step 300). A determination is first made as to whether the packet received is a binding protocol packet and so needing analysis (step 310). If the packet received is not a binding protocol packet, the packet is passed on for further processing (or forwarding to the next network node or destination node) (step 320). Conversely, if the packet received is a binding protocol packet, the packet is analyzed based on filtering rules (step 330). Next, a determination is made as to whether the packet, based on the filtering rules employed, is acceptable (step 340). If the packet received is an acceptable packet, the packet is again passed on for further processing (or forwarding to the next network node or destination) (step 320). However, if the packet received is not acceptable, based on the filtering rules employed (step 340), appropriate action is taken in response to the receipt of the bad packet (step 350).

Such actions include simply dropping the bad packet, logging the receipt of the bad packet, or interrupting the flow of packets from the given source node, or a combination thereof, among other such possible actions.

As noted, FIG. 3 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as a computer system 800, described subsequently. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; and volatile storage media including registers, buffers or caches, main memory, RAM, and the like. In a UNIX-based embodiment, the software modules may be embodied in a file which may be a device, a terminal, a local or remote file, or the like. Other new and various types of computer-readable media may be used to store the software modules discussed herein.

Figure 4A:
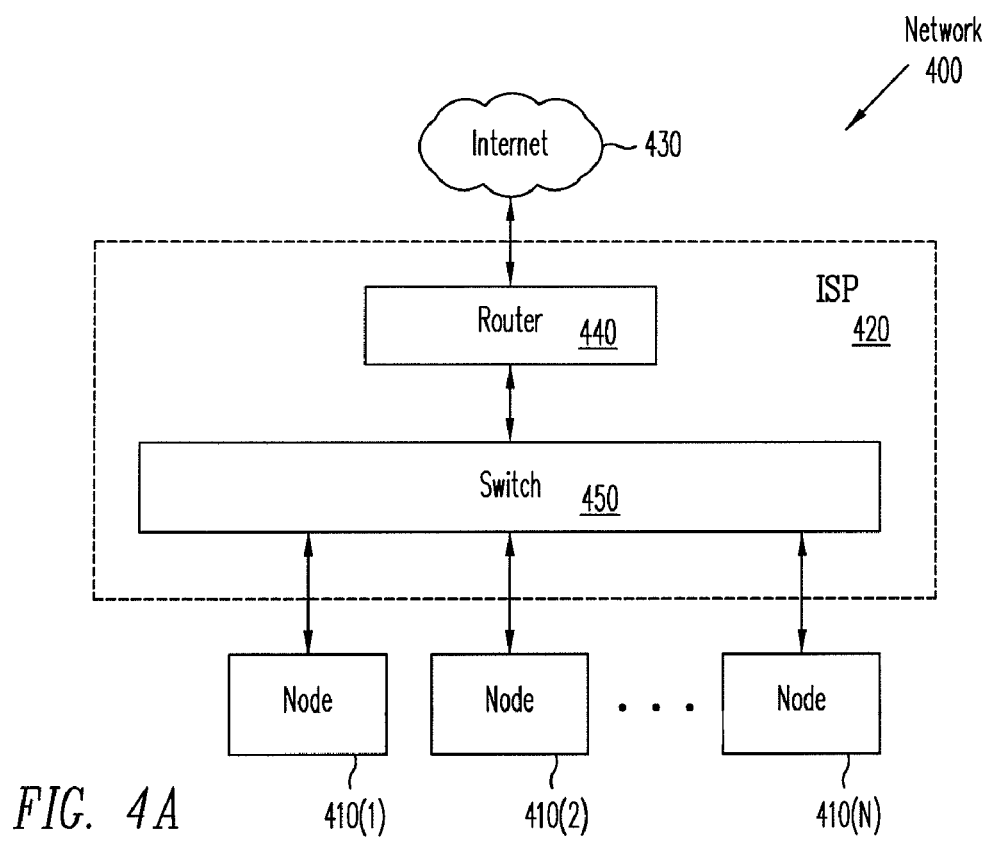
FIG. 4A is a block diagram illustrating a network according to embodiments of the present invention.

FIG. 4A illustrates a network 400 according to embodiments of the present invention. Network 400 includes a number of user nodes (depicted in FIG. 4A as nodes 410(1)-(N)), an ISP 420, and internet 430. ISP 420, as depicted in FIG. 4A, supports connectivity between nodes 410(1)-(N) and internet 430 using a router 440 and a switch 450. Switch 450 supports processes according to embodiments of the present invention, as so protects nodes 410(1)-(N) from "man-in-the-middle" attacks, sniffing and other such attacks, as well as erroneous inter-layer bindings. It will be noted that, in a more general sense, the structures and process of the present invention can be included in other network elements (e.g., router 440) without loss of generality or applicability, as the functionality of such network elements may be combined. It will also be noted that, while the discussion herein is in terms of a switch (switch 450), this is merely an illustrative example—the present invention could be implemented in a hub or other environment.

Figure 4B:
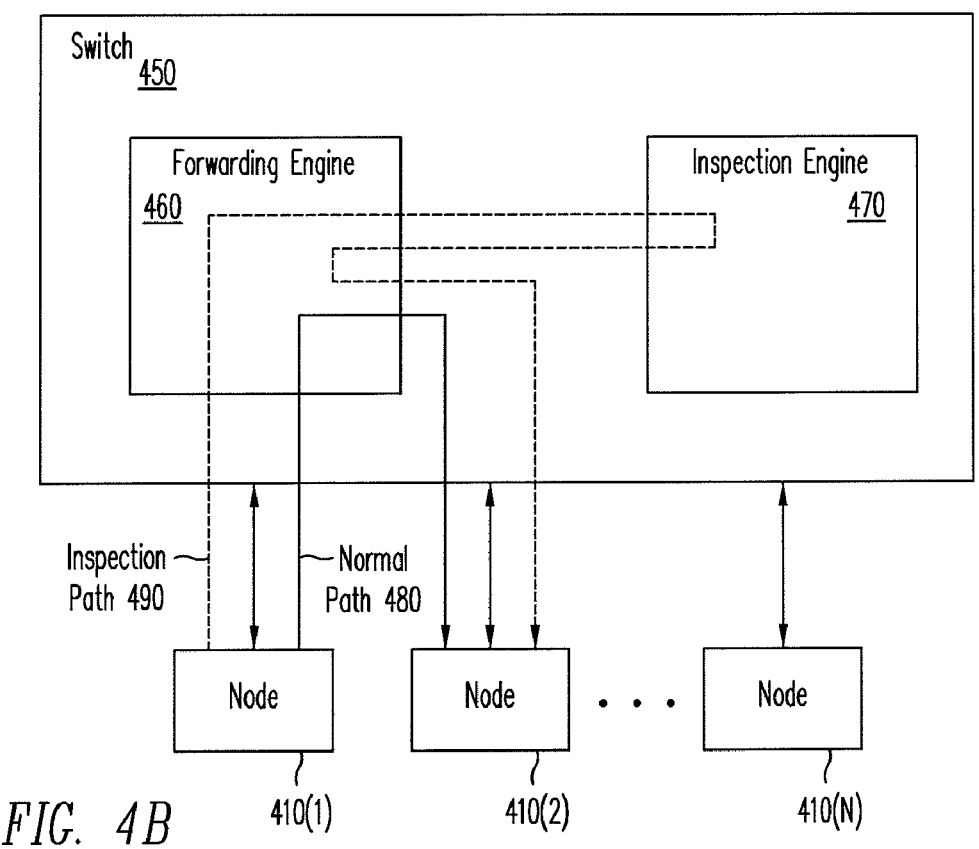
FIG. 4B is a block diagram illustrating( ) portions of the network of FIG. 4A in greater detail.

FIG. 4B illustrates portions of network 400 in greater detail. Switch 450 is now depicted as including a forwarding engine 460 and an inspection engine 470. Forwarding engine 460, in the simplest terms, makes a determination as to which port (and so node) a packet is forwarded (i.e., sent). Inspection engine 470 performs the function of inspecting those packets forwarded for inspection by forwarding engine 460. Also shown in FIG. 4B are two paths that packets may take through switch 450, a normal path 480 and an inspection path 490. As is apparent, normally, packets follow normal path 480, from, for example, node 410(1), through forwarding engine 460, to the intended destination, node 410(2). These packets are the greater majority of the packets processed by switch 450, and so a process such as that depicted in FIG. 3, carried out by switch 450, has little impact on such traffic flow. However, for the inter-layer binding protocol packets which are of interest, an alternate path is followed, that of inspection path 490. In following inspection path 490, such packets are sent, for example, from a given node (e.g., node 410(1)), intended for another such node (e.g., node 410(2)), but are forwarded by forwarding engine 460 to inspection engine 470 for inspection, as a result of their being inter-layer binding protocol packets. If inspection engine 470 finds that the packets are acceptable, inspection engine 470 then returns the now-inspected packets to forwarding engine 460, for forwarding on to their destination (e.g., node 410(2)).

Figure 5:
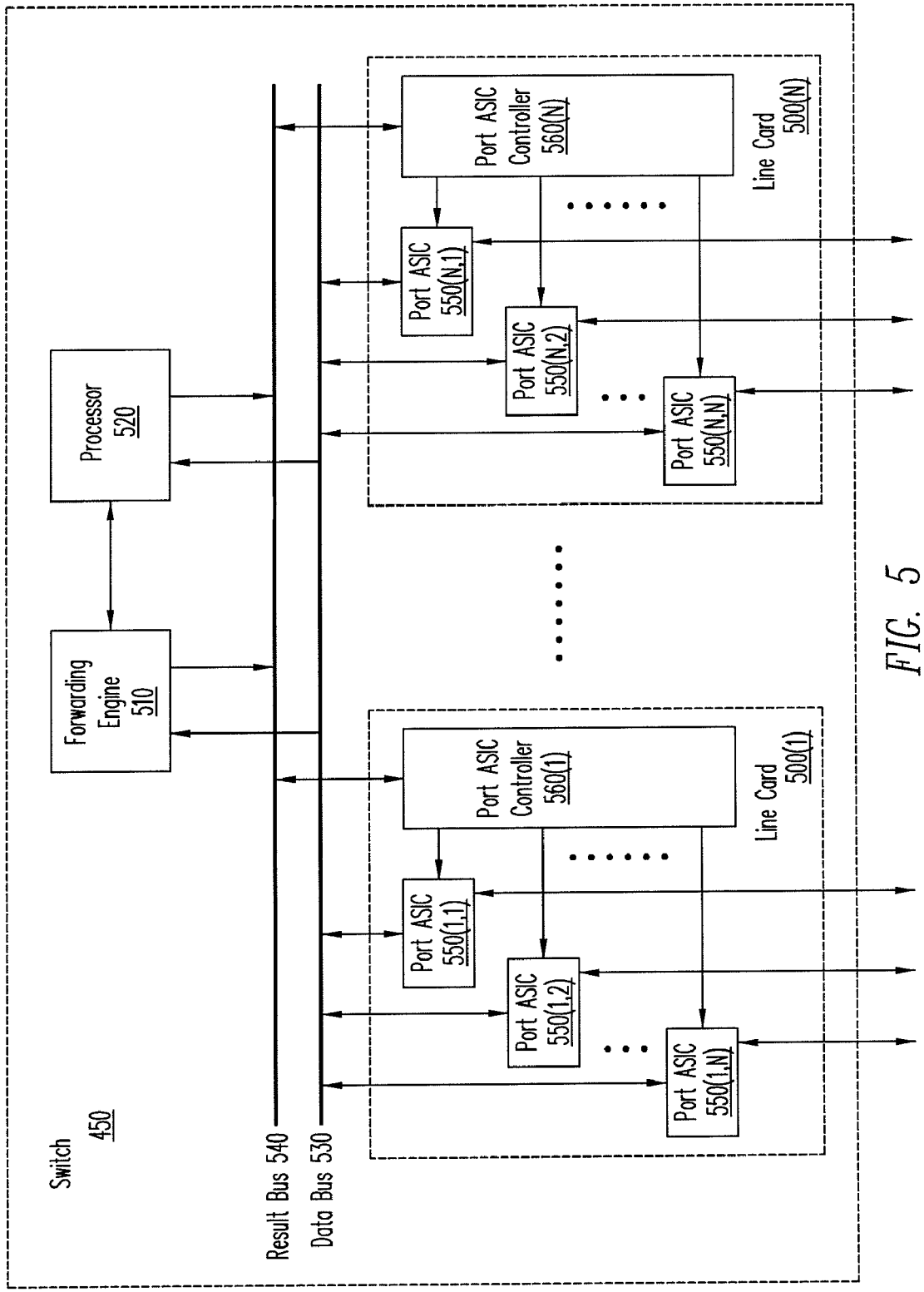
FIG. 5 is a block diagram illustrating a switch according to embodiments of the present invention.

FIG. 5 is a block diagram illustrating switch 450 and details pertinent to the description of embodiments of the present invention in greater detail. Switch 450, as depicted in FIG. 5, includes a number of line cards (lines cards 500(1)-(N)) which are coupled to forwarding engine 510 (in the manner of forwarding engine 460 of FIG. 4B) and a processor 520 (in the manner of inspection engine 470 of FIG. 4B) via data bus 530 and result bus 540 (again, in the manner of FIG. 4B). Each of line cards 500(1)-(N) includes, among other structures, a number of port devices (depicted in FIG. 5 as port ASICs (1,1)-(N,N)) which are under the control of a port controller (depicted in FIG. 5 as being controlled by a respective one of port ASIC controllers 560(1)-(N)).

As noted in connection with FIG. 4B, while a non-ILBP packet is simply forwarded to it's intended port, an ILBP packet is identified and analyzed, in a system according to the present invention. In terms of FIG. 5, upon receipt, a packet (of either type) is sent from the one of port ASICs 550(1,1)-(N,N) at which the packet was received to those devices coupled to data bus 530 (e.g., others of port ASICs 550(1,1)-(N,N) and FE 510). FE 510 then makes a determination as to whether the packet is an ILBP packet. If such is not the case, the (non-ILBP) packet is forwarded by FE 510 to the intended one of port ASICs 550(1,1)-(N,N) by indicating to a corresponding one of port ASIC controllers 560(1)-(N) that the copy of the packet held in the given one of port ASICs 550 (1,1)-(N,N) should be sent out on the corresponding port.

However, if the packet is an ILBP packet, the (ILBP) packet is forwarded to processor 520 for inspection. Processor 520 inspects the packet (to some degree, under software control (depending on how specialized processor 520 is architected, design decisions between hardware and software implementation, and the like). If the packet contains an illegal binding (e.g., a bad ARP packet with an illegal binding between IP and MAC address), processor 520 indicates to FE 510 and port ASIC controllers 560(1)-(N) that the packet in question should be dropped. Thus, the packet is never sent out of switch 450. Alternatively, if the packet contains a legal binding, processor 520 indicates to FE 510 and port ASIC controllers 560(1)-(N) that the packet in question is acceptable, and FE 510 indicates to a corresponding one of port ASIC controllers 560(1)-(N) that the copy of the packet held in the given one of port ASICs 550(1,1)-(N,N) should be sent out on the corresponding port.

Figure 6:
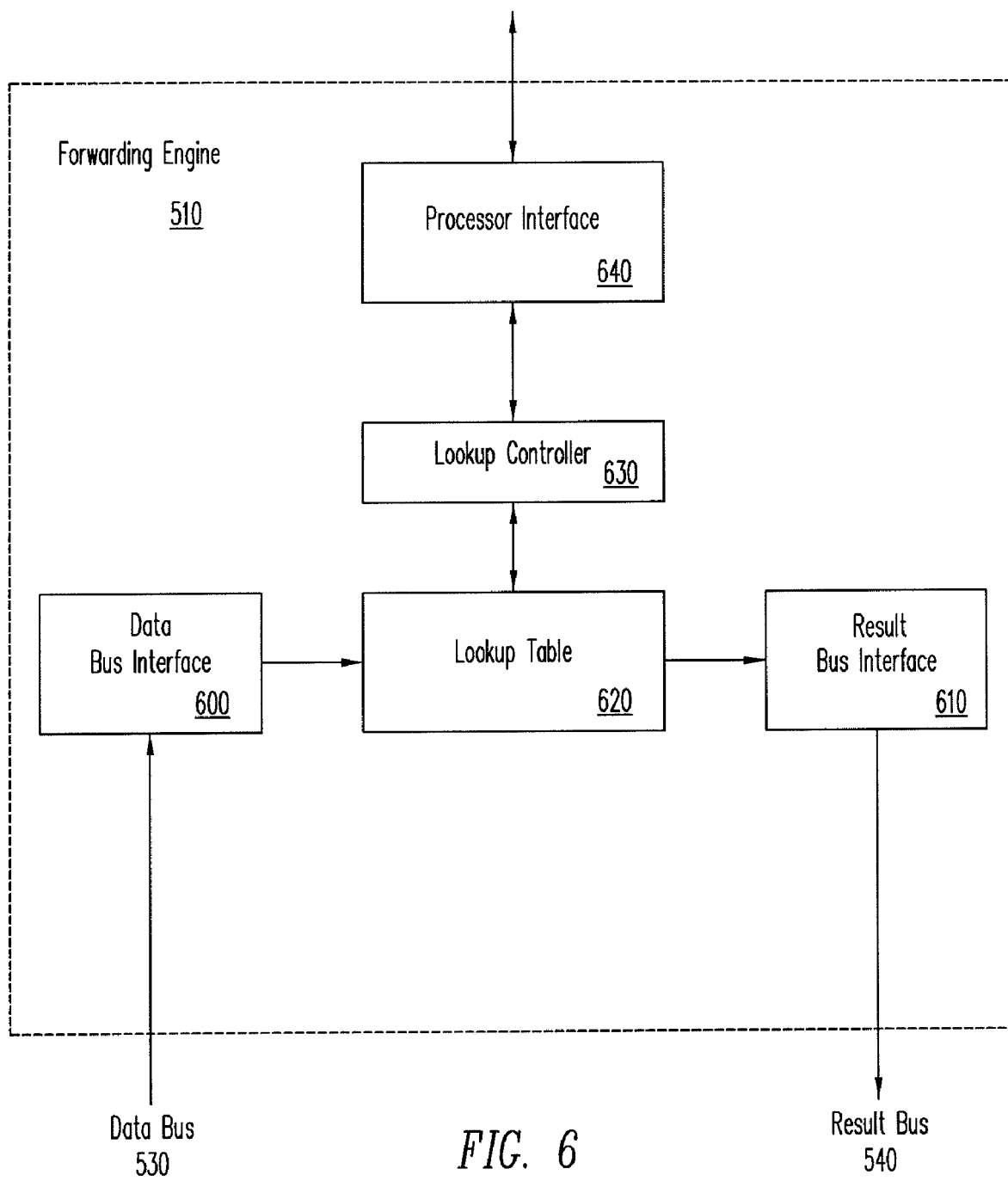
FIG. 6 is a block diagram illustrating in further detail the features of a forwarding engine according to embodiments of the present invention.

FIG. 6 is a block diagram illustrating in further detail the features of forwarding engine (FE) 510. As in FIG. 5, FE 510 is depicted in FIG. 6 as being coupled to data bus 530 and result bus 540. FE 510 interfaces with data bus 530 via a data bus interface 600. In a similar manner, FE 510 interfaces with result bus 540 via an result bus interface 610. Among other structures contained in FE 510, a lookup table 620 is coupled at an input to data bus interface 600, and at an output to result bus interface 610. Lookup table 620 receives packets from data bus 530 via data bus interface 600 and, after performing an analysis on the given packet, provides control to various of the structures of switch 450 on result bus 540 via result bus interface 610. Lookup table 620 is under the control of a lookup controller 630, which interfaces, in turn, with a processor interface 640.

Figure 7:
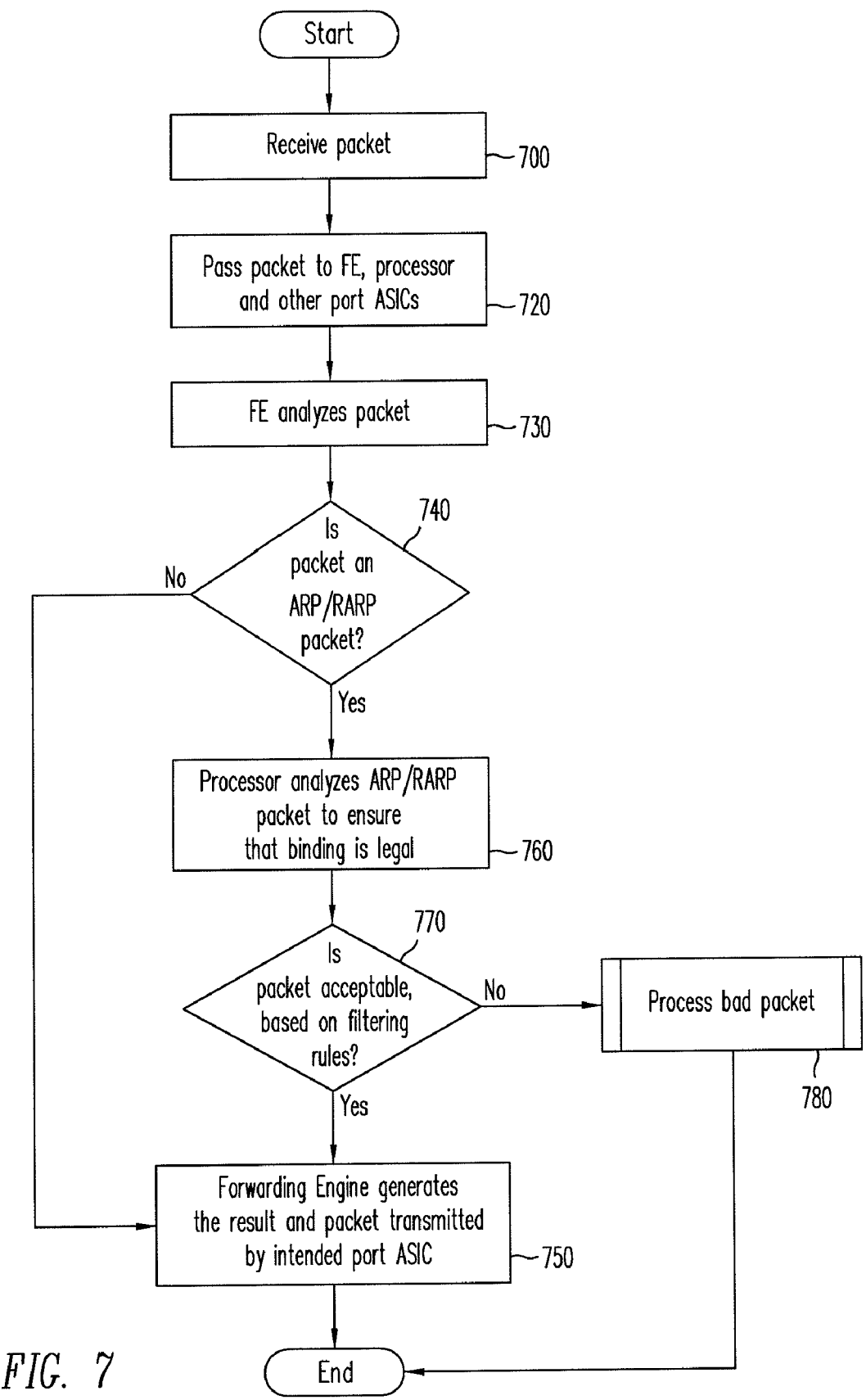
FIG. 7 is a flow diagram which illustrates a process such as that depicted in FIG. 3 when implemented on a network element according to FIG. 5.

FIG. 7 is a flow diagram which illustrates a process such as that depicted in FIG. 3 when implemented on a network element supporting the structures depicted in FIG. 5. With that being the case, the actions depicted in FIG. 7 will be discussed in terms of the structures that appear in FIGS. 5 and 6. The process depicted in FIG. 7 begins with the receipt of a packet by one of port ASICs (1,1)-(N,N) (step 700). This packet will be intended for another network node attached to one other of port ASICs (1,1)-(N,N), and typically, a one of port ASICs (1,1)-(N,N) on another one of line cards (1)-(N).

In certain embodiments of switch 450 and the present invention, the packet in question is passed to all possible destinations within switch 450 (e.g., including processor 520, others of port ASICs 550(1,1)-(N,N) and FE 510) (step 720). In such a scenario, while all (or a subset of all) possible locations receive the given packet, barring the receipt of instructions (or control signals) to actually process the given packet, these destinations will simply drop or overwrite the packet, ignoring its receipt. Next, having received the given packet, FE 510 proceeds with a pre-inspection analysis of the packet (step 730). Depending on how FE 510 is programmed, and the inter-layer binding protocol packets to be inspected, FE 510 may take any number of actions at this point.

While implementing a reasonably large amount of this process in hardware is desirable, it will be apparent to one of skill in the art that the ability to load the rules used in analyzing packets in a manner according to embodiments of the present invention is also desirable, because the use of software-based rules allows for ease of upgrade, dynamic analysis, lower cost resulting from simpler hardware, and other such advantages. A determination is then made as to whether the packet received is an inter-layer binding protocol packet (e.g., in the case contemplated in FIG. 7, and ARP/RARP packet) (step 740). In most cases, typically, the received packet will not be an inter-layer binding protocol packet, and so, after the forwarding engine generates the result, the packet is transmitted to the intended one of port ASICs 550 (1,1)-(N,N), for transmission to the intended node (step 750). In this way, the analysis of packets to determine whether an inter-layer binding is allowable is not part of the critical path for the typical packet, and so does not greatly impact the flow of packets through switch 450. However, if the packet is an inter-layer binding protocol packet (again, e.g., an ARP/RARP packet), the copy of the packet sent to processor 520 is analyzed by processor 520 to ensure that the inter-layer binding asserted therein is legal (step 760). If the inter-layer binding asserted in the packet is acceptable (step 770), the packet is transmitted by the intended port ASIC, as before (step 750). If the packet is determined to be unacceptable (step 770), the bad packet is processed (step 780).

This processing can take on any one of a number of forms including simply dropping the packet, once analyzed. Unfortunately, once an unfriendly party (e.g., a hacker) learns of this ability to distinguish forged inter-layer bindings, the unfriendly party may then attempt to flood the analysis of such packets by sending inordinately large number of such packets in an attempt to overwhelm the analysis performed by processor 520. In that case, the processing of bad packets can be designed to cope with such situations, as described in further detail with regard to FIG. 8.

Figure 8:
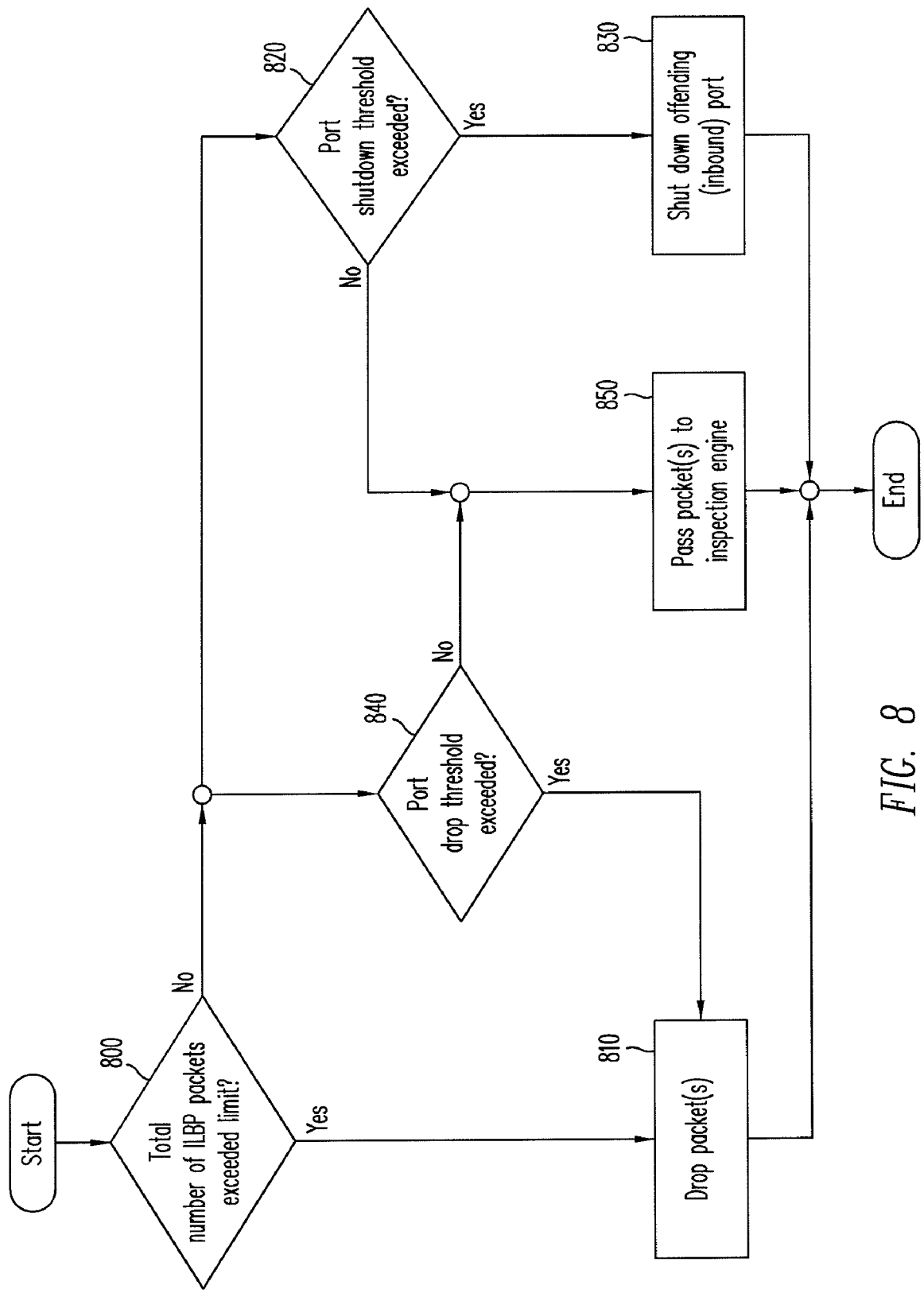
FIG. 8 is a flow diagram of a process for rate limiting inter-layer binding protocol packets according to embodiments of the present invention.

FIG. 8 is a flow diagram of a process for rate limiting inter-layer binding protocol (ILBP) packets to avoid being overwhelmed by a flood of such packets. The process of FIG. 8 begins with a determination as to whether the total number of such packets have exceeded a limit, which may be pre-set or dynamic (step 800). As noted previously, an advantage of such software-based analysis is the ability to dynamically respond to varying packet traffic conditions, and so take into account network conditions when performing such analyses. If the total number of packets has exceeded this limit (step 800), the packet(s) can simply be dropped (step 810).

It should be noted that FE 510 can perform any one of a number of actions based on rules indicating, for example, whether FE 510 should drop the packet (prior to its analysis by processor 520), or in the alternative, cause the inbound port on which the bad packet was received to be closed. In the example depicted in FIG. 8, if the total number of packets received (e.g., in a given unit time) exceeds the limit that is currently in place (step 800), FE 510 simply drops the packet, prior to sending the packet to processor 520 for analysis, and informs port ASIC controllers 560(1)-(N) that copies of the bad packet potentially held by one or more of port ASICs 550(1,1)-(N,N) should be dropped as well (step 810).

If the total number of packets received (e.g., in a given unit time) has not exceeded the limit that is currently in place (step 800), a determination is made as to whether a second limit, referred to herein as a port shutdown limit, has been exceeded (step 820). Such a condition can indicate any one of a number of problems, including a packet storm caused either maliciously or erroneously. If the port shutdown limit has been exceeded, the offending (inbound) port is shut down (step 830). This effectively disconnects the node generating the large numbers of ILBP packets from the rest of the network, as well as the internal structures of switch 450 (in particular, FE 510 and processor 520). This prevents, for example, a third party, having detected that packets sent to enable sniffing have been dropped, the third party from causing an overload situation in order to force a switch to accept bad ILBP packets or the like. Also, if the total number of packets received (e.g., in a given unit time) has not exceeded the limit that is currently in place (step 800), a determination is also made as to whether a third limit, referred to herein as a port drop threshold, has been exceeded (step 840). Here, the number of illegal ILBP packets has exceed some limit, and so the offending packet(s) should be dropped (step 810). If the port drop threshold has not been exceeded and the port has not been shutdown, the packet(s) is (are) passed to the inspection engine (e.g., processor 520) for inspection (step 850).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A network device comprising:
a forwarding engine, wherein
said forwarding engine comprises
a lookup table, and
a lookup table controller, coupled to said lookup table; and
an inspection engine, coupled to said forwarding engine, wherein
said lookup table controller is configured to cause said forwarding engine to forward a packet to said inspection engine, if said packet is a inter-layer binding protocol packet, and
said inspection engine is configured to inspect said inter-layer binding protocol packet.

2. The network device of claim 1, wherein said inspection engine is configured to inspect said inter-layer binding protocol packet by virtue of being configured to inspect an inter-layer binding represented therein.

3. The network device of claim 2, wherein said inter-layer binding protocol packet is an ARP packet and said inter-layer binding is a binding between an IP address and a MAC address.

4. The network device of claim 1, wherein said forwarding engine is configured to determine whether said packet is said inter-layer binding protocol packet.

5. The network device of claim 4, wherein said forwarding engine is configured to make said determination by virtue of being configured to analyze a header of said packet.

6. A network element comprising:
a processor;
a computer readable medium coupled to said processor; and
computer code for inspecting packets, said computer code encoded in said computer readable medium and configured to cause said processor to:
process each packet of a plurality of packets, wherein
said packets are processed at a processing rate,
said computer code is configured to cause said processor to process said each packet by virtue of being configured to cause said processor to
determine if said packet is an inter-layer binding protocol packet, and
said inter-layer binding protocol packet indicates a binding between a first network layer address and a second network layer address,
inspect said each packet, if said each packet is an inter-layer binding protocol packet, wherein
said computer code is configured to cause said processor to
inspect said each packet by virtue of being configured to cause said processor to
determine whether a binding of said each packet is an acceptable binding, and
limit said processing rate.

7. The network element of claim 5, wherein said computer code is further configured to cause said processor to:
drop said packet, if said inspecting determines said binding is not said acceptable binding.

8. The network element of claim 6, wherein said computer code is further configured to cause said processor to:
forward said packet, if said packet is not said inter-layer binding protocol packet.

9. A method for inspecting packets comprising:
processing each packet of a plurality of packets, wherein
said processing processes said packets at a processing rate,
said processing comprises
determining if said each packet is an inter-layer binding protocol packet, and
said inter-layer binding protocol packet indicates a binding between a first network layer address and a second network layer address;
if said each packet is an inter-layer binding protocol packet, inspecting said each packet, wherein
said inspecting comprises
determining whether a binding of said each packet is an acceptable binding; and
limiting said processing rate.

10. The method of claim 9, further comprising:
if said inspecting determines said binding is not said acceptable binding, dropping said packet.

11. The method of claim 9, further comprising:
if said packet is not said inter-layer binding protocol packet, forwarding said packet.

12. The method of claim 9, wherein said limiting comprises:
comparing a total number of said packets to a limit; and
if said total number of said packets is greater than said limit, dropping said packet.

13. The method of claim 9, wherein said packets are received on a port and said limiting comprises:
comparing a total number of said packets to a port shutdown threshold; and
if said total number of said packets is greater than said port shutdown threshold, shutting down said port.

14. The method of claim 9, wherein said limiting comprises:
comparing a total number of said packets to a port drop threshold; and
if said total number of said packets is greater than said port drop threshold, dropping said packet.

* * * * *